US008340656B2

(12) United States Patent
Manne et al.

(10) Patent No.: US 8,340,656 B2
(45) Date of Patent: Dec. 25, 2012

(54) SYSTEMS AND METHODS FOR SYNCHRONIZING DATA TRANSMISSION OVER A VOICE CHANNEL OF A TELEPHONE NETWORK

(75) Inventors: Gopi Manne, Lone Tree, CO (US); William Beals, Engelwood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 494 days.

(21) Appl. No.: 12/575,445

(22) Filed: Oct. 7, 2009

(65) Prior Publication Data

US 2011/0081900 A1    Apr. 7, 2011

(51) Int. Cl.
*H04W 4/00*    (2009.01)
(52) U.S. Cl. ............... 455/422.1; 455/265; 455/502; 455/208; 455/418; 455/419; 455/420; 370/324; 370/503; 370/507; 370/509; 370/510; 370/512
(58) Field of Classification Search .......... 455/265, 455/502, 208, 418, 419, 420; 370/324, 503, 370/507, 509, 510, 512
See application file for complete search history.

(56) References Cited

U.S. PATENT DOCUMENTS

| 4,852,086 | A | * | 7/1989 | Eastmond et al. ............ 370/343 |
| 5,675,371 | A | | 10/1997 | Barringer ........................ 348/6 |
| 5,794,144 | A | | 8/1998 | Comer et al. ................ 455/426 |
| 5,974,094 | A | | 10/1999 | Fines et al. .................... 375/335 |
| 6,044,266 | A | | 3/2000 | Kato ............................ 455/422 |
| 6,151,491 | A | | 11/2000 | Farris et al. ................... 455/412 |
| 6,167,253 | A | | 12/2000 | Farris et al. ................... 455/412 |
| 6,493,338 | B1 | | 12/2002 | Preston et al. ................ 370/352 |
| 6,665,382 | B2 | | 12/2003 | Dunn et al. ................. 379/93.32 |
| 6,665,873 | B1 | | 12/2003 | Van Gestel et al. ........... 725/136 |
| 6,741,684 | B2 | | 5/2004 | Kaars ........................ 379/110.01 |
| 6,750,801 | B2 | | 6/2004 | Stefanik ....................... 341/176 |
| 6,826,227 | B1 | | 11/2004 | Duval et al. .................. 375/240 |
| 7,035,285 | B2 | | 4/2006 | Holloway et al. ............ 370/474 |
| 7,058,356 | B2 | | 6/2006 | Slotznick .................... 455/3.05 |
| 7,061,885 | B2 | | 6/2006 | Kurtz ............................ 370/329 |

(Continued)

FOREIGN PATENT DOCUMENTS

KR    10-0726107 B1    6/2007

(Continued)

OTHER PUBLICATIONS

European Standard, "Digital Video Broadcasting (DVB); Interaction channel through the Global System for Mobile communications (GSM)"; ETSI EN 301 195 V1.1.1, Feb. 1, 1999, pp. 1-14.

(Continued)

*Primary Examiner* — Kamran Afshar
*Assistant Examiner* — Khalid Shaheed
(74) *Attorney, Agent, or Firm* — Seed IP Law Group PLLC

(57) ABSTRACT

Various embodiments facilitate data communication between a client device and a remote device over a voice channel of a telephone system. In one embodiment, the data communication over the voice channel is synchronized to align with voice frames utilized by the telephone system to transmit communicated data between the devices. In some embodiments, the synchronization is performed by determining an offset between a received synchronization audio signal and the voice frames used by the telephone system to process the synchronization audio signal, such as based on an amount of energy present in the received synchronization audio signal.

26 Claims, 10 Drawing Sheets

U.S. PATENT DOCUMENTS

| | | | |
|---|---|---|---|
| 7,069,211 B2 | 6/2006 | Chiu et al. | 704/221 |
| 7,117,001 B2 | 10/2006 | Lin et al. | 455/517 |
| 7,401,326 B1 | 7/2008 | Durham et al. | 717/139 |
| 7,823,183 B2 | 10/2010 | Mickle et al. | 725/132 |
| 7,864,717 B2 | 1/2011 | Dorr | 370/267 |
| 2001/0036828 A1* | 11/2001 | Butler et al. | 455/434 |
| 2002/0038210 A1 | 3/2002 | Yajima et al. | 704/230 |
| 2003/0033223 A1 | 2/2003 | Mizuno | 705/27 |
| 2003/0046083 A1 | 3/2003 | Devinney, Jr. et al. | 704/273 |
| 2003/0139933 A1 | 7/2003 | Kimmel | 704/275 |
| 2004/0073915 A1 | 4/2004 | Dureau | 725/9 |
| 2004/0085576 A1 | 5/2004 | Paz-Pujalt et al. | 358/1.15 |
| 2004/0181801 A1 | 9/2004 | Hagen et al. | 725/32 |
| 2004/0203374 A1 | 10/2004 | Zilliacus | 455/41.2 |
| 2004/0250273 A1 | 12/2004 | Swix et al. | 725/25 |
| 2005/0278648 A1 | 12/2005 | Taylor | 715/768 |
| 2006/0023852 A1 | 2/2006 | Casey | 379/93.18 |
| 2006/0053436 A1 | 3/2006 | Allwein et al. | 725/1 |
| 2006/0154679 A1* | 7/2006 | Chang | 455/502 |
| 2006/0190966 A1 | 8/2006 | McKissick et al. | 725/61 |
| 2007/0118770 A1 | 5/2007 | Kahn et al. | 713/193 |
| 2007/0169144 A1 | 7/2007 | Chen et al. | 725/30 |
| 2007/0173231 A1 | 7/2007 | Fadell | 455/412.1 |
| 2007/0245384 A1 | 10/2007 | Walter et al. | 725/62 |
| 2008/0077950 A1 | 3/2008 | Burke et al. | 725/1 |
| 2008/0125098 A1 | 5/2008 | Bruce et al. | 455/414.1 |
| 2008/0134278 A1 | 6/2008 | Al-Karmi | 725/141 |
| 2008/0155636 A1 | 6/2008 | Cruz et al. | 725/131 |
| 2008/0196066 A1 | 8/2008 | Matz | 725/62 |
| 2009/0070796 A1 | 3/2009 | Stomakhin et al. | 725/1 |
| 2009/0070886 A1 | 3/2009 | Lecomte et al. | 726/27 |
| 2009/0111392 A1 | 4/2009 | Taylor | 455/88 |
| 2009/0232139 A1* | 9/2009 | Kelley | 370/392 |
| 2009/0245276 A1 | 10/2009 | Manne | 370/466 |
| 2009/0247152 A1 | 10/2009 | Manne | 455/426.2 |
| 2009/0249407 A1 | 10/2009 | Manne et al. | 725/68 |
| 2009/0296000 A1 | 12/2009 | Pal | 348/725 |
| 2010/0157973 A1* | 6/2010 | Bekiares et al. | 370/350 |

FOREIGN PATENT DOCUMENTS

| | | |
|---|---|---|
| WO | 01/08441 | 2/2001 |
| WO | 01/99295 | 12/2001 |
| WO | 2004/039103 | 5/2004 |

OTHER PUBLICATIONS

Hall, "PocketMail Composer: E-mail Solution for the Road," RV Hometown, Nov./Dec. 2002, URL = http://www.rvhometown.com/HTML/Articles/PocketMail.htm, download date Jan. 28, 2008, 4 pages.

International Search Report for PCT/US2009/038017, mailed Sep. 22, 2009, 7 pages.

Office Action for Korean Application No. 10-2010-7024017, dated Dec. 1, 2011, 4 pages.

* cited by examiner

SYSTEMS AND METHODS FOR SYNCHRONIZING DATA TRANSMISSION OVER A VOICE CHANNEL OF A TELEPHONE NETWORK

TECHNICAL FIELD

The technical field relates to systems, methods, and apparatus to facilitate data transmission over a voice channel of a telephone communication system.

BACKGROUND

In many situations and environments, there is often a need to exchange data between distributed devices. For example, in pay television systems (e.g., cable and satellite broadcast systems), there is often a need for back channel communication between a television receiver, such as a set-top box, and a centralized processing server. For example, the television receiver and the centralized processor may exchange data for purposes of service fulfillment, diagnostics, and the like. Traditionally, such back channel communication has been performed over traditional fixed-line phone services, such as using modem to communicate between the television receiver and the remote processing server.

As other telephone services, such as mobile phones, cell phones, Voice over Internet Protocol ("VoIP"), and the like, have become more ubiquitous and are replacing traditional fixed-line phones, such other telephone services have become a convenient medium for exchanging data and other information.

BRIEF SUMMARY

In one embodiment, a method for transmitting data via a voice channel of a telephone system is provided. The method includes: transmitting a first frame of audio to a remote device via the voice channel of the telephone system; receiving from the remote device via the telephone system an indication of an alignment offset between the first frame of audio and a first voice frame utilized by the telephone system to transmit at least a portion of the first frame of audio to the remote device; determining based on the indication of the alignment offset a transmission timing for transmitting a second frame of data in audio form to the remote device via the voice channel of the telephone system to cause the second frame of data in audio form to align with a second voice frame utilized by the telephone system to transmit the second frame of data in audio form; and transmitting the second frame of data in audio form to the remote device via the voice channel in accordance with the transmission timing.

In another embodiment, a method for facilitating transmission of data via a voice channel of a telephone system, includes: receiving first audio including a first frame of audio transmitted from a client device via the voice channel of the telephone system; analyzing the first audio to determine an alignment offset between the first frame of audio and a first voice frame utilized by the telephone system to transmit at least a portion of the first frame of audio from the client device; sending an indication of the alignment offset to the client device via the voice channel; and receiving second audio including a second frame of data in audio form transmitted from the client device via the voice channel of the telephone system, the second frame of data in audio form being aligned with a second voice frame utilized by the telephone system to transmit the second frame of data in audio form from the client device using the indication of the alignment offset.

In a further embodiment, a device includes: one or more processors and; a data communication manager that is configured to, when executed by at least one of the one or more processors, facilitate transmission of data via a voice channel of a telephone system by: receiving first audio including a first frame of audio transmitted from a client device via the voice channel of the telephone system; analyzing the first audio to determine an alignment offset between the first frame of audio and a first voice frame utilized by the telephone system to transmit at least a portion of the first frame of audio from the client; and sending an indication of the alignment offset to the client via the voice channel.

BRIEF DESCRIPTION OF THE DRAWINGS

The components in the drawings are not necessarily to scale relative to each other. Like reference numerals designate corresponding parts throughout the several views.

DETAILED DESCRIPTION

Techniques are described for, among other things, facilitating data communication between a client device and a remote device over a voice channel of a wireless telephone communication system. Data is communicated between the client device and the remote device as encoded audio signals exchanged during a phone call established between the devices over a voice channel of a wireless telephone communication system. Many wireless telephone communication systems divide audio signals of phone calls into frames which are processed for transmission via a voice channel of the wireless telephone communication system—such frames of the wireless telephone communication system are referred to herein as "voice frames." As one illustrative example, in a typical wireless telephone communication system, audio signals are processed as 20 millisecond (ms) voice frames which are compressed and routed over the communication system at a rate of 50 frames per second. In some embodiments, the data communication between the client device and the remote device may be synchronized so as to align the encoded audio signals that are exchanged during the phone call with the voice frames utilized by the wireless telephone communication system to process the encoded audio signals for transmission between the devices over the wireless telephone network.

Figure 1A:
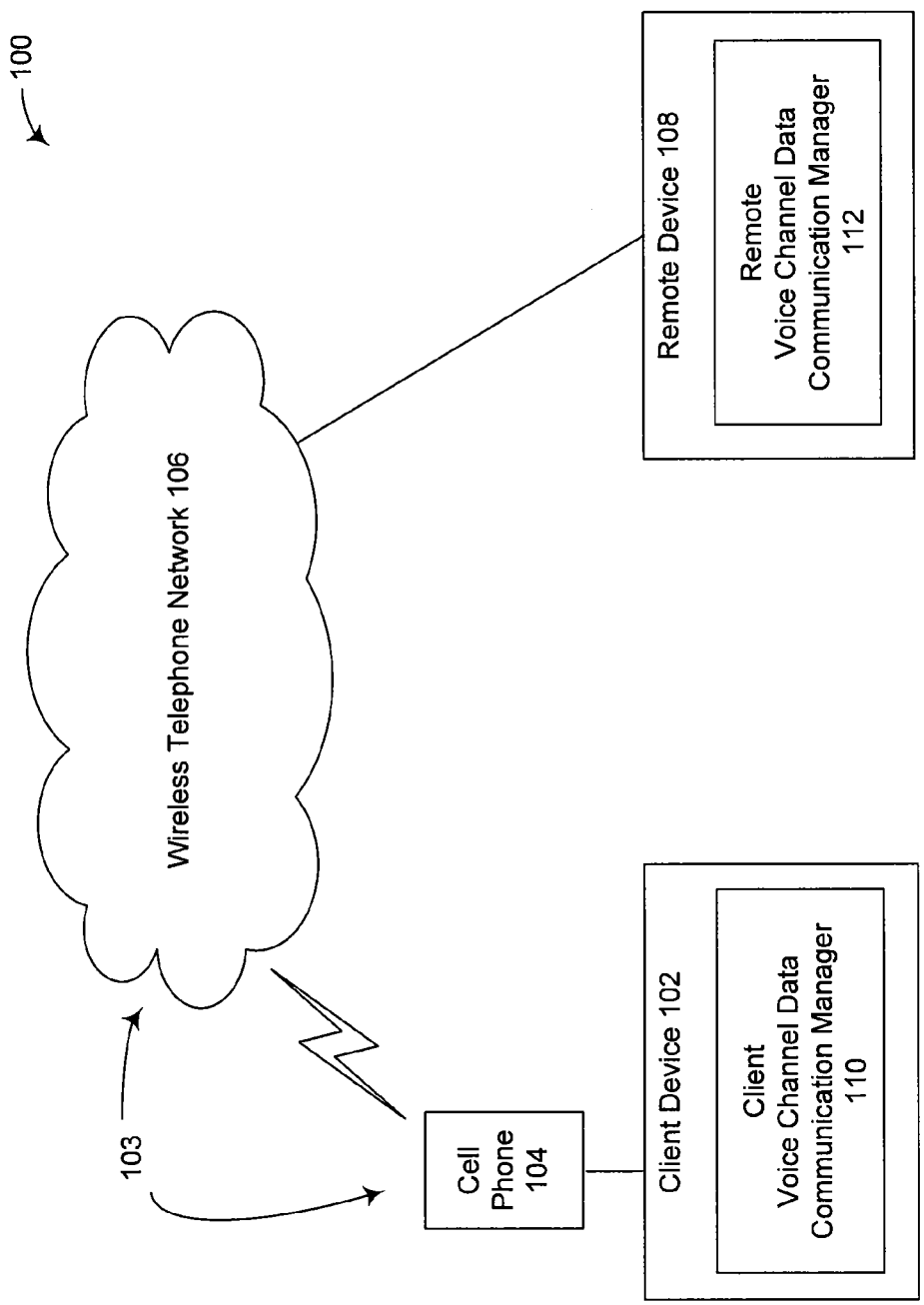
FIG. 1A is a block diagram illustrating an embodiment of a voice channel data communication system.

FIG. 1A is a block diagram illustrating an example embodiment of a voice channel data communication system 100 in which the various described techniques may be implemented. In this illustrated embodiment, the voice channel data communication system 100 includes a client device 102 and a remote device 108 communicating over a voice channel of a wireless telephone communication system 103 to exchange data. In particular, the client device 102 and remote device 108 exchange data by transmitting encoded audio signals representative of the data during a phone call between the client device 102 and the remote device 108 over the wireless telephone communication system 103. A client voice channel data communication manager 110 is included in the client device 102, and a remote voice channel data communication manager 112 is included in the remote device 108. The client and remote voice channel data communication managers 110 and 112 perform operations related to exchanging data between the client device 102 and the remote device 108 via a voice channel of a wireless telephone communication system 103.

The wireless telephone communication system 103 includes a wireless telephone 104 (shown here as a cell phone) and a wireless telephone network 106. The wireless telephone network 106 communicatively couples the wireless telephone 104 to the remote device 108. The wireless telephone network 106 may be any type of wireless network, such as a cellular network, and may include various network devices such a base station and a mobile switching center. The wireless telephone 104 and the wireless telephone network 106 may communicate using any type of wireless protocol, such as Code Division Multiple Access ("CDMA"), Time Division Multiple Access ("TDMA"), Global System for Mobile Communications ("GSM") and the like. In addition, the wireless telephone 104 and the wireless telephone network 106 may utilize any protocol for speech coding, such as Enhanced Variable Rate Codec ("EVRC"), Selectable Mode Vocoder ("SMV") Codec, Variable-Rate Multimode ("VRM") Codec, 4GV—Enhanced Variable Rate Codec ("EVRC") Wideband ("WB"), Adaptive Multi-Rate ("AMR") Codec, GSM Full Rate ("FR") Codec, GSM Enhanced Full Rate ("EFR") Codec, Half-Rate ("HR") Codec, Adaptive Multi-Rate Wide-Band ("AMR WB") Codec, and the like.

The wireless telephone 104 is communicatively coupled to the client device 102 with a connection permitting the client device 102 to interact with the wireless telephone 104 to send and receive audio signals during a phone call (also referred to as a "phone connection") with the remote device 108 over a voice channel of wireless telephone network 106. In some embodiments, the client device 102 may establish a phone connection with the remote device 108 by interacting with the wireless telephone 104 to place a phone call to and/or receive a phone call from the remote device 108 over the wireless telephone network 106. After the phone connection is established, the client device 102 sends audio signals to the remote device 108 via the phone connection, such as by transmitting audio signals to the wireless telephone 104, which in turn processes and transmits the audio signals to the remote device 108 via the wireless telephone network 106. The client device 102 also receives from the wireless telephone 104 audio signals sent from the remote device 108 during the phone call. The client device 102 and the wireless telephone 104 may be communicatively coupled in various ways in various embodiments, such as via a wireless Bluetooth connection, a universal serial bus (USB), a headset jack of the wireless telephone 104, or any other type of wired or wireless connection. In some embodiments the wireless telephone 104 and the client device 102 may be acoustically coupled. Although the wireless telephone 104 is illustrated as being external to the client device 102, in some embodiments the wireless telephone 104 may be integrated into the client device 102.

The remote device 108 is communicatively coupled to the wireless telephone network 106 such that the remote device 108 may send and receive audio signals during a phone call with the client device 102 via the wireless telephone communication system 103. In some embodiments, the remote device 108 may be configured to make a phone call to and/or receive a phone call from the wireless telephone 104 via the wireless telephone network 106, such as to establish a phone connection with the client device 102. The remote device 108 may be connected to the wireless telephone network 106 by way of a public switched telephone network ("PSTN"), although other embodiments are possible. For example, in some embodiments, the remote device 108 may be connected to the wireless telephone network 106 by way of a wireless telephone, such as in a manner similar to that discussed above with respect to the client device 102.

In the wireless telephone communication system 103, during a phone call over a voice channel, audio signals are transmitted by dividing the audio signal into a series of voice frames that are processed for transmission over the wireless telephone network 106. Each of the voice frames corresponds to a respective portion of the audio signal. As part of processing the voice frames, the wireless telephone communication system 103 may compress and convert the audio corresponding to each voice frame into a digital packet that is routed over the wireless telephone network 106 to a receiver. The receiver converts each received digital packet back into an audio signal corresponding to a portion of the original audio signal. In a typical embodiment, the wireless telephone communication system 103 utilizes a 20 millisecond voice frame, which means that every 20 milliseconds of an audio signal that is to be transmitted over a voice channel is processed and sent as one respective voice frame. Of course, other voice frame sizes are possible in other embodiments. It is to be noted that an audio signal transmitted during a phone call over a voice channel of a wireless telephone communication system is typically voice audio generated by a human speaker; however, as is described in more detail below, in the voice channel data communication system 100, the audio signals correspond to audio signal data generated by either the client device 102 and/or the remote device 108 to facilitate data communication between the devices.

The client device 102 sends data to the remote device 108 via the wireless telephone communication system 103 as encoded audio signals. To send such data, the client device 102 generates one or more encoded audio signals representative of data to be sent to the remote device 108 and transmits the one or more encoded audio signals to the remote device 108 over an established phone connection between the devices. For example, the client device 102 may interact with the wireless telephone 104 to place a call to and/or answer a call from the remote device 108. After the call is established, the client device 102 transmits one or more encoded audio signals to the wireless telephone 104, which processes and routes the encoded audio signals to the remote device 108 via the wireless telephone network 106. After the remote device 108 receives the encoded audio signal via the phone connection, the remote device 108 decodes the encoded audio signal to determine the data represented by the encoded audio signal.

The data sent from the client device to the remote device may be any type of digital data, such as, but not limited to, text, audio, video, information, commands, etc. To convert the digital data into an encoded audio signal for transmission via a voice channel of the wireless telephone communication system 103, the client device 102 selects, receives, and/or otherwise obtains the digital data to be transmitted to the remote device 108, divides the digital data into a series of one or more m-bit segments, and determines a respective audio frequency and/or frequency spectrum to represent each m-bit segment. For example, in some embodiments, the client device may process the digital data in 10-bit segments, with each 10-bit segment having a distinct frequency spectrum representative of the particular bit sequence of the 10-bit segment. For each m-bit segment of the digital data, the client device 102 transmits the corresponding audio frequency spectrum to the remote device 108 via the phone connection.

Each encoded audio signal representing a particular m-bit segment of digital data is transmitted from the client device 102 as a single frame of audio. As used herein, a "frame of audio" or an "audio frame" refers to a segment of audio having a particular duration. For example, each encoded audio signal corresponding to an m-bit segment of digital data is transmitted by the client device 102 as an audio signal having a particular duration, referred to herein as a "data audio frame." In cases where a series of multiple data audio frames are needed to represent the digital data (e.g., when the digital data exceeding m-bits), each data audio frame of the series may be transmitted from the client device 102 to the remote device 108 during successive time intervals, with the time intervals corresponding to the length of the audio frame. In some embodiments, the data audio frame has a duration that corresponds to the duration of the voice frame utilized by the wireless telephone communication system 103. For example, in an embodiment where the wireless telephone communication system 103 utilizes 20 millisecond voice frames, the data audio frame has a corresponding duration of 20 milliseconds.

When the remote device 108 receives encoded audio corresponding to the transmitted data audio frames, the remote device 108 processes the encoded audio using the same data audio frame of the client device to extract the data represented by the audio. For example, the remote device 108 divides the received encoded audio into frames having the same duration as the data audio frames (e.g., 20 ms) and decodes the audio corresponding to each frame to determine the digital data corresponding to the encoded audio of each frame. As one illustrative example, if the client device 102 transmitted four data audio frames, each having a duration of 20 milliseconds, then the remote device receives 80 milliseconds of audio corresponding to the four transmitted frames (e.g., 4 frames× 20 ms), which it processes in 20 millisecond frames to extract the data.

In various embodiments, the client device 102 may use various encoding techniques to convert digital data into encoded audio signals. In at least one embodiment, digital data is converted into encoded audio signals having voice-like characteristics of human speech. Many wireless telephone communication systems are optimized to compress voice audio for transmission over a voice channel of the wireless telephone communication system with minimal distortion. As such, using voice-like audio signals minimizes distortion that may otherwise occur during processing and transmission of encoded audio across the wireless telephone communication system 103. Various encoding techniques may be used to convert data into encoded audio signals that correspond with the audio frequency range of human speech, such as including, but not limited to, a code excited linear prediction ("CELP") technique or a multiple frequency shift-keying ("MFSK") technique. In other embodiments, the data may be converted into other types of audio signals using various other modulation techniques. For example, a frequency shift-keying ("FSK") modulation technique may be used to convert the digital data into traditional modem-like audio signals.

Additional details related to data communication over a voice channel of a wireless telephone communication system are included in U.S. patent application Ser. No. 12/058,935, filed Mar. 31, 2008, and entitled "Systems, Methods, and Apparatus for Transmitting Data over a Voice Channel of a Wireless Telephone Network," which is hereby incorporated by reference in its entirety.

In some embodiments, the client device 102 may interact with the remote device 108 via a voice channel of the wireless telephone communication system 103 to synchronize the audio frames containing data transmitted by the client device 102 with voice frames utilized by the wireless telephone communication system 103 to process the data audio frames for transmission via a voice channel. As previously noted, the client device 102 transmits data to the remote device 108 via a voice channel of the wireless telephone communication system 103 as a series of one or more audio frames, with each audio frame having a length that corresponds to the length of the voice frames utilized by the wireless telephone communication system 103. These audio frames contain data, not voice, but are synchronized with the voice frames, so that each data audio frame that is transmitted by the client device 102 is processed by the wireless telephone communication system 103 corresponding to a single voice frame. As one illustrative example, consider a case where the data audio frames and voice frames are 20 ms frames, and the client device 102 transmits four successive data audio frames A, B, C, and D. When the transmitted data audio frames are aligned with the voice frames, the wireless telephone communication system 103 processes audio corresponding to each of the four data audio frames into respective 20 millisecond voice frames for transmission over the network. For example, the wireless telephone communication system 103 processes four voice frames respectively including audio corresponding to A, B, C, and D. An example of aligned data audio frames is illustrated with respect to FIG. 3D, explained later herein.

It will be appreciated that in some embodiments synchronizing the data audio frames with the voice frames does not require the data audio frames to exactly align with the voice frames. For example, in some embodiments, a close alignment is often sufficient to ensure high quality transmission of the data audio frames. Thus, in some such embodiments, a first data audio frame processed into a voice frame by the wireless telephone communication system 103 may include a small amount of a neighboring data audio frame. In such cases, the resulting audio signal received at the remote device 108 will be sufficiently representative of the transmitted first data audio frame for the remote device 108 to extract the corresponding digital data, even after having been processed in a voice frame with portions of a neighboring digital audio frame.

To synchronize the data audio frames, the client device 102 and the remote device 108 interact over a phone connection to exchange audio signals to determine an appropriate alignment between the data audio frames transmitted from the client device 102 to the remote device 108 via the phone connection with voice frames utilized by the wireless telephone communication system 103 to process the data audio frames. Furthermore, in some embodiments, the client and the remote devices may interact to align data audio frames transmitted from the remote device 108 to the client device 102 via the phone connection with voice frames utilized by the wireless telephone communication system 103. Details related to such interactions and to synchronizing data audio frames are discussed in more detail below with respect to FIGS. 2A-2B and 3A-3D.

If data audio frames transmitted by the client device 102 are not sufficiently synchronized with the voice frames utilized by the wireless telephone communication system 103 to process the data audio frames, it may be difficult for the remote device 108 to extract the originally transmitted data from the audio it receives. For example, consider a case where the data audio frames and voice frames are 20 millisecond frames, and the client device 102 transmits four successive data audio frames A, B, C, and D. If the data audio frames and the voice frames are out of synch by an offset of 10 milliseconds, then the wireless telephone communication system 103 may process a first voice frame that includes 10 ms of A and 10 ms of B, a second voice frame that includes 10 ms of B and 10 ms of C, a third voice frame that includes 10 ms of C and 10 ms of D, and so on. After the voice frames are compressed and transmitted across the communication network 106, the resulting audio signal received by the remote device 108 will be distorted to an extent that it is difficult and/or impossible for the remote device 108 to determine the original digital data that was encoded by the client device 102.

In some embodiments, a client device 102 may still successfully transmit data to a remote device 108, even when the data audio frames are significantly out of synch with the voice frames. For example, the client device 102 may transmit each data audio frame twice in succession, such that each encoded audio signal representing an m-bit segment of data is transmitted as a sequential pair of data audio frames. Thus, even if the voice frames mix audio signals from adjacent data audio frames, every other voice frame will contain only audio signals corresponding to the same encoded audio signal, which may be successfully decoded by the remote device 108 upon receipt. For example, the client device 102 may convert a sequence of digital data into to two encoded audio signals A and B, respectively representing a first and second m-bit segment of the sequence of digital data. When the client device transmits the encoded audio signals corresponding to A and B, it will transmit each encoded audio signal as a duplicated pair of data audio frames such as, frames $A_1$ and $A_2$ each containing encoded audio signal A; and frames $B_1$ and $B_2$ containing B. At the wireless telephone communication system 103, the transmitted data audio frames will be processed into a first voice frame that includes portions of $A_1$ and $A_2$, a second voice frame that includes portions of $A_2$ and $B_1$, a third voice frame that includes portions of $B_1$ and $B_2$, and so on. Thus when the voice frames are processed and routed through the wireless network, the remote device 108 will receive some frames that do not include mixed encoded audio signals, e.g., the first and third frames. Although such a solution may be satisfactory in some embodiments, it is often not desirable, as repeating data audio frames reduces the rate at which data can be transmitted between the client and remote devices.

Although embodiments are described above and below in which the client device 102 sends data to the remote device 108, in some embodiments, the remote device 108 sends data to the client device 102. For example, in such embodiments, the remote device 108 may convert digital data into encoded audio signals and transmit the encoded audio signals to the client device 102 over the wireless communication system 103, with the client device 102 receiving the encoded audio via its connection with the wireless telephone 104 and decoding the received encoded audio to extract the data represented by the encoded audio.

As previously noted, the client voice channel data exchange manager 110 and the remote voice channel data exchange manager 112 perform operations related to data communication via a voice channel of the wireless telephone communication system. For example, in some embodiments, the client voice channel data exchange manager 110 may perform operations such as establishing a phone connection with the remote device 108, transmitting/receiving audio from the wireless telephone 104, encoding and/or decoding data audio frames, and/or performing operations to synchronize data audio frames. The remote voice channel data exchange manager 112 may perform operations such as establishing a phone connection with the client device 102, transmitting/receiving audio from the wireless telephone network 106, encoding and/or decoding data audio frames, and/ or performing operations to synchronize data audio frames with voice frames.

Furthermore, although techniques are described in which client devices and remote devices perform operations via a wireless telephone system, the techniques may be applied in other telephone systems, such as including telephone systems that utilize frame-based compression, e.g., a Voice over Internet Protocol (VoIP) system and the like.

In at least one embodiment described below with respect to FIG. 1B, the client device 102 is a television receiving device (e.g., a set-top box) and the remote device 108 is a server configured to interact with the television receiving device. However, the described techniques may be used in a variety of other contexts. For example, the client device 102 may be any type of device and/or computing system that aggregates, receives, and/or otherwise obtains data to provide to a remote device 108 and/or has need of data provided from a remote device 108, such as, but not limited to, a set-top box, a laptop computer, a desktop computer, a server, an automotive computer, an embedded computer, a personal electronic device, etc. Similarly, the remote device 108 may be any type of device and/or computing system that provides data to and/or obtains data from the client device 102.

Figure 1B:
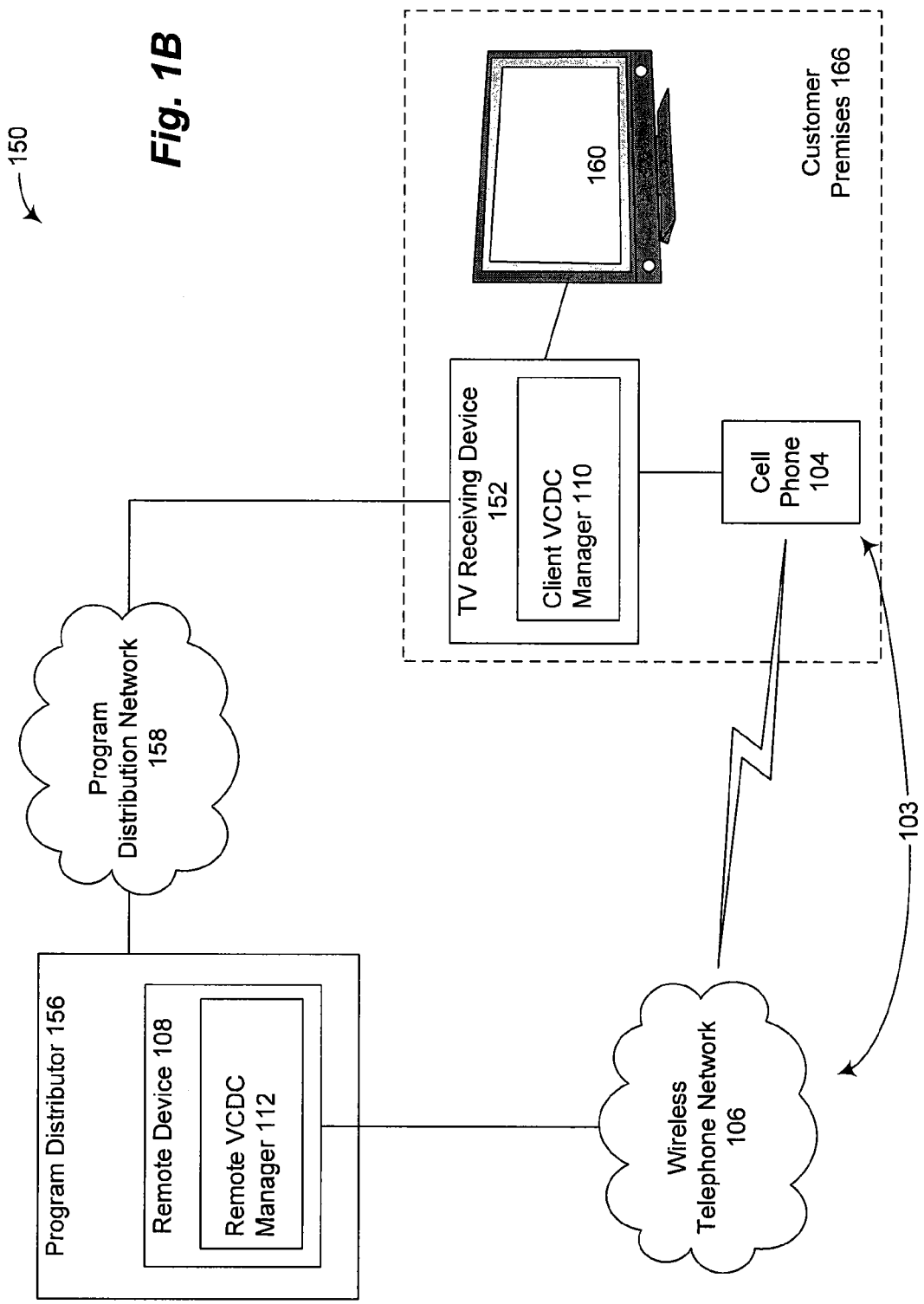
FIG. 1B is a block diagram illustrating an example program distribution environment in which embodiments of a voice channel data exchange system may be implemented.

FIG. 1B is a block diagram illustrating an example program distribution environment 150 in which an embodiment of a voice-based data exchange system may be implemented. In the program distribution environment 150, a program distributor 156 may provide content to a customer located at a customer premises 166 (e.g., a home, apartment, office, etc.). Such content is often provided to the customer by use of a television receiving device 152 configured to receive the content from a program distributor 156 via a program distribution network 158, and display such content to a user via a presentation device 160. The content may include television programs, movies, pay-per-view events, video on-demand, and/ or other types of content including, but not limited to, audio, video, and/or other data.

The television receiving device 152 is communicatively coupled to a program distribution network 158 to receive content provided by the program distributor 156. The program distribution network 158 may include many different types of communication media, now known or later developed, such as telephony systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems. The television receiving device 152 may be any suitable converter device or electronic equipment that is operable to receive programming, such as a set-top box, a television converter, a television recording device, a satellite receiver, a cable receiver, a television tuner, and the like. The presentation device 160 may be a television ("TV"), a personal computer ("PC"), a sound system receiver, a digital video recorder ("DVR"), a compact disk ("CD") device, a game system, or the like.

In this illustrated embodiment of the program distribution environment 150, an embodiment of the client voice channel data communication manager 110 and the remote voice channel data communication manager 112 are operating respectively on the television receiving device 152 and the remote device 108, such as to facilitate data communication between the television receiving device 152 and the remote device 108 over a voice channel of a wireless telephone communication system 103. For example, in this illustrated embodiment, the remote device 108 is being provided by the program distributor 156 for back-channel data communication with the television receiving device 152 via a voice channel of a wireless telephone communication system 103. For example, in some embodiments, the television receiving device 152 and the remote device 108 may exchange various types of information, such as, but not limited to, diagnostics, pay-per-view fulfillment, etc.

In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the described techniques and/or functions is not limited by the particular order, selection, or decomposition of steps described with reference to any particular module, component, or routine.

Figure 2A:
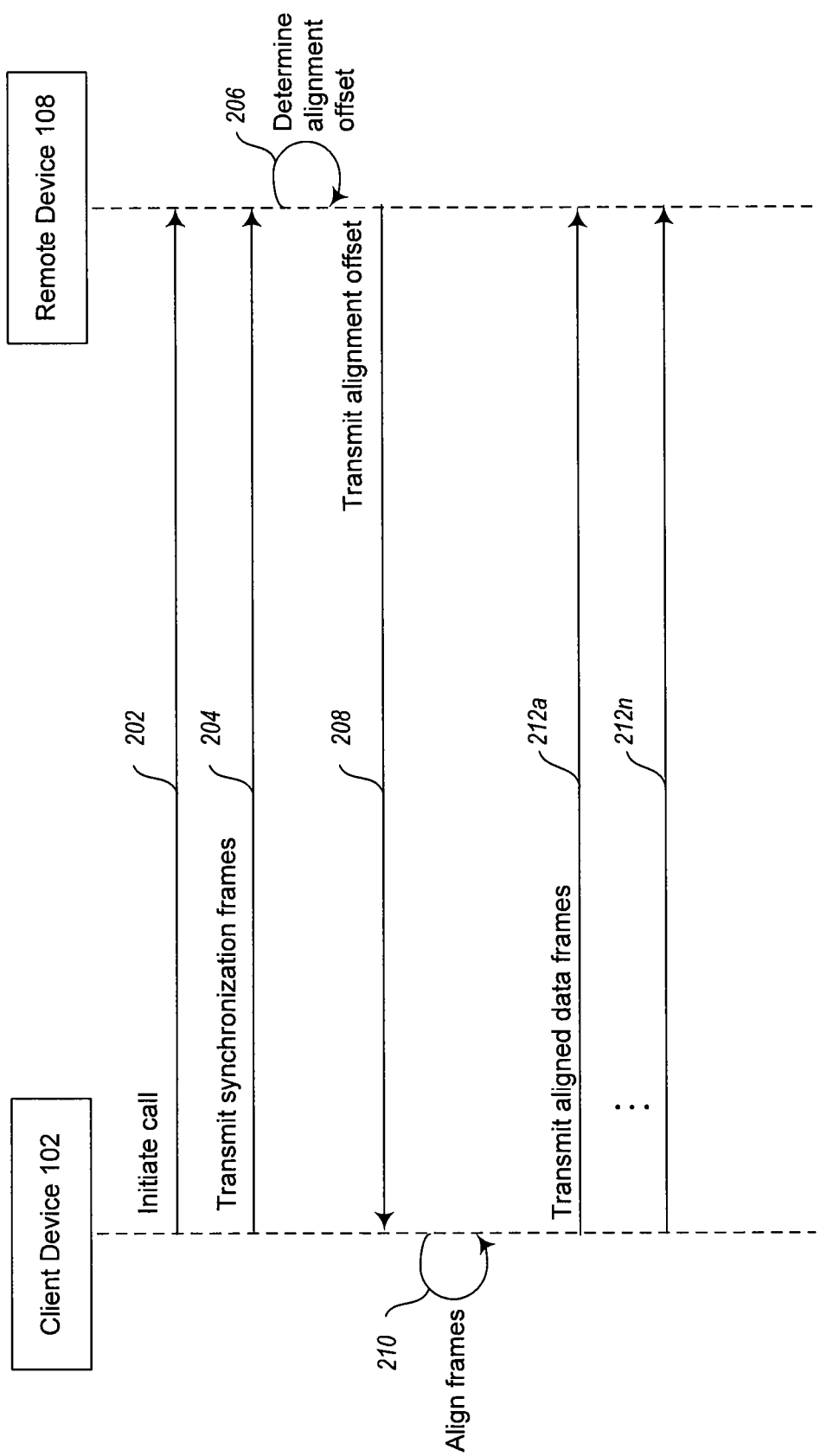
FIGS. 2A-2B illustrate example interactions for synchronizing data audio frames in a voice channel data communication system.
Figure 2B:
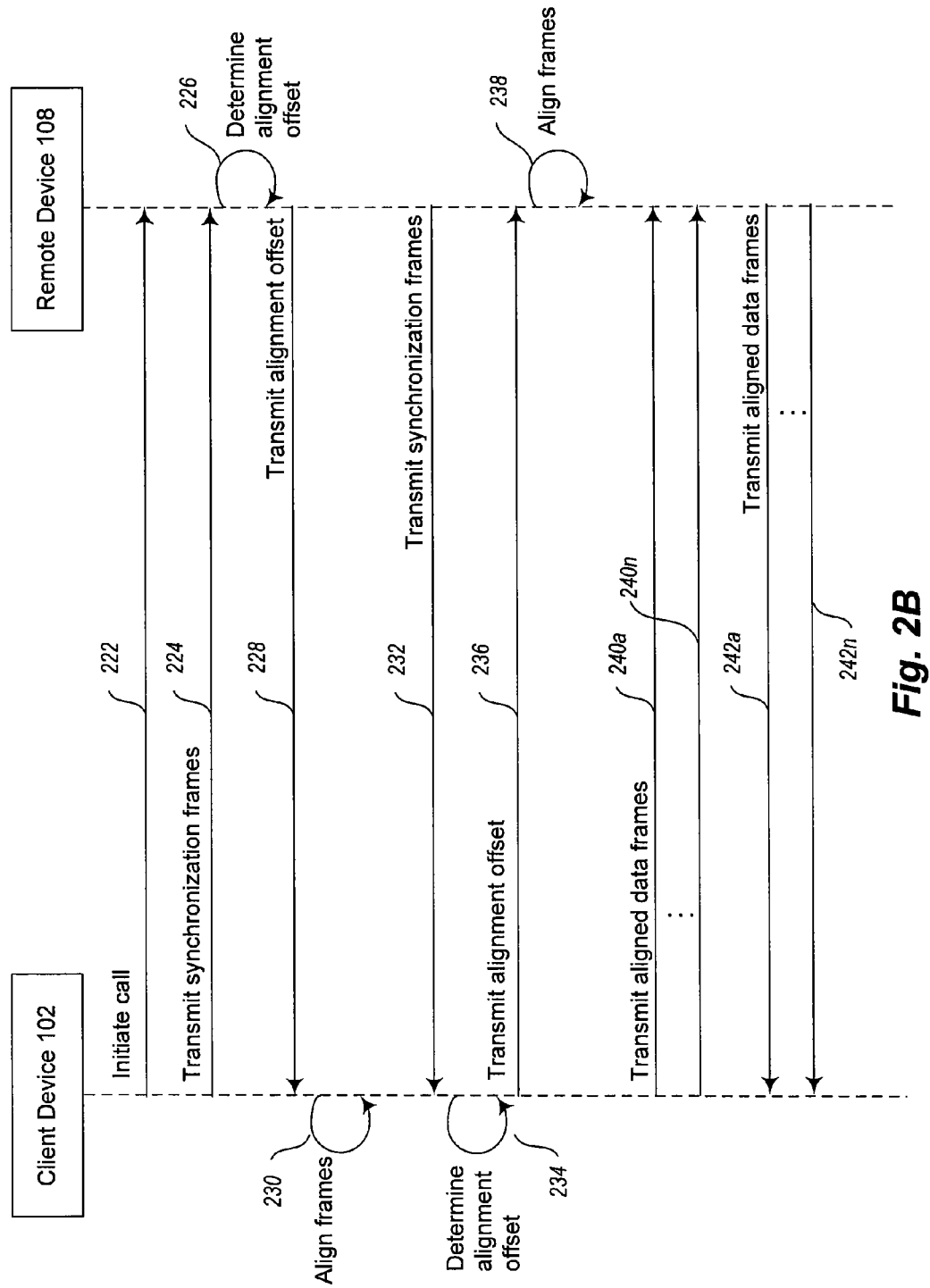

FIGS. 2A-2B illustrate example interactions between a client device 102 and a remote device 108 for synchronizing data audio frames in a wireless telephone communication system of the type shown in FIGS. 1A and 1B. Furthermore, when the client device 102 and/or the remote device 108 transmit, send, and/or otherwise communicate audio signals (e.g., audio frames, synchronization audio frames, data audio frames, etc.) via the wireless telephone communication system, the wireless telephone communication system may process the audio signals as voice frames for transmission across the wireless telephone system, such as previously described.

In particular, FIG. 2A depicts the client device 102 interacting with remote device 108 to align a transmission of data audio frames from the client device 102 with voice frames utilized by the wireless telephone communication system to process the data audio frames for transmission to the remote device.

At 202, the client device 102 initiates a phone call to the remote device 108 via a voice channel of a wireless telephone communication system, such as to establish a phone connection with the remote device 108. For example, the client device 102 may interact with a wireless telephone (e.g., a cell phone) to dial a phone number corresponding to the remote device 108. A phone connection is established when the remote device 108 answers the call or is otherwise connected to the call. In some embodiments, the remote device 108 may instead initiate the call to the client device 102, such as by calling a phone number associated with a wireless telephone communicatively coupled to the client device 102, with the client device answering the call to establish the phone connection.

At 204, after the phone connection is established, the client device 102 transmits synchronization audio signals to the remote device via the phone connection. In some embodiments, the synchronization audio signals transmitted by the client device 102 are transmitted as a series of audio frames, referred to herein as "synchronization audio frames," that are sequentially transmitted from the client device 102 to the remote device 108 via the phone connection. Each synchronization audio frame, like the data audio frames, has a duration corresponding to that of the voice frames utilized by the wireless telephone communication system over which the phone connection has been established (e.g., 20 milliseconds).

Figure 3A:
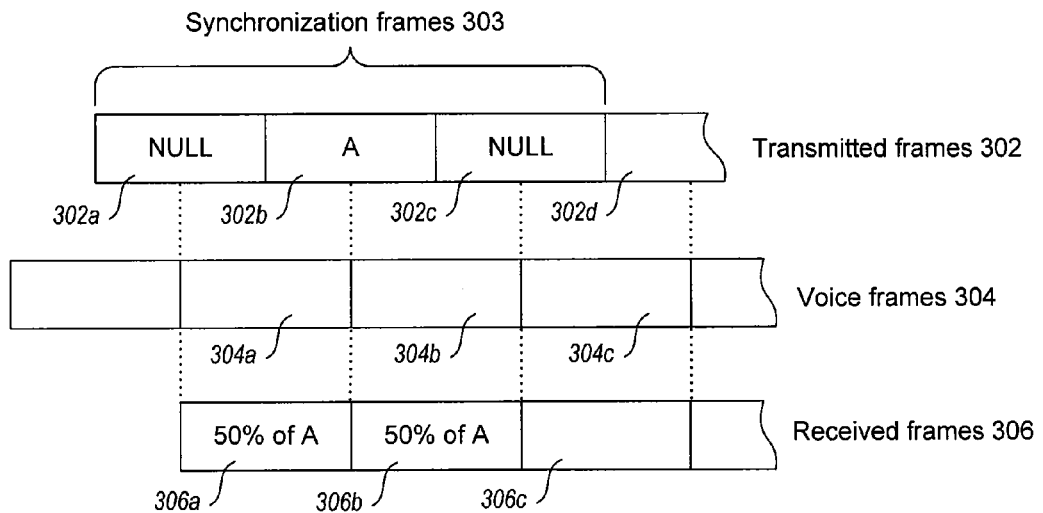
FIGS. 3A-3D illustrate example embodiments of transmitting audio frames in a voice channel data communication system.

In one embodiment, the client device 102 transmits a sequence of three synchronization audio frames corresponding respectively to a first NULL audio frame, a higher frequency (non-NULL) audio frame, and a second NULL audio frame (e.g., see synchronization frames 303 in FIG. 3A). For example, in some such an embodiments, the client device 102 may transmit such synchronization audio frames at a 20 ms time interval as follows: transmit a NULL audio signal for 20 ms, transmit a non-NULL audio signal for 20 ms, and transmit another NULL audio signal for 20 ms. In some embodiments, the NULL audio signal corresponds to audio silence, while the non-NULL audio signal may be any non-zero audio signal. Additional details related to synchronization audio frames are discussed with respect to FIGS. 3A-3C.

At 206, after the remote device 108 receives audio corresponding to the synchronization frames transmitted at interaction 204, the remote device 108 analyzes the received audio to determine or otherwise approximate an offset between the synchronization frames and the underlying voice frames utilized by the wireless telephone communication system to process the synchronization frames. The offset refers to a measure of misalignment between the frames. Typically, the offset is a measure of time between the start of a synchronization frame and the start of a voice frame.

In particular, at 206, the remote device 108 determines or otherwise approximates the offset by analyzing the energy (or amplitude) of the received audio signal. In at least one embodiment, the offset may be determined by analyzing the first two audio frames of the received audio, each having a duration corresponding to that of the synchronization frame (e.g., 20 ms), and then determining the amount of energy present in each of the frames relative to each other. Based on the relative amount of energy in the first two frames, a corresponding offset may be determined. In particular, the relative amount of energy may directly correspond to a relative amount of offset. For example, when the first frame has 25 percent of the energy and the second frame has 75 percent of the energy, then the offset is one-fourth of a frame-length (e.g., 5 ms when using 20 ms frames); when the first and second frames have equal amounts of energy, then the offset is half a frame-length (e.g., 10 ms when using 20 ms frames); when the first frame has 75 percent and the second frame has 25 percent, then the offset is three-fourths of a frame-length (e.g., 15 ms when using 20 ms frames); etc. The energy of an audio frame may be calculated using various methods, such as including, but not limited to, determining a mean square estimation of the energy of the audio signal corresponding to the frame.

As previously noted, in some embodiments, the synchronization of data audio frames to voice frames does not require exact alignment to achieve satisfactory transmission of the data audio frames over a wireless telephone communication system. As such, the remote device 108 may determine approximate offsets based on the received synchronization audio. Additional details related to determining an offset based on synchronization audio frames transmitted over a voice channel of a wireless telephone communication system are discussed with respect to FIGS. 3A-3C.

At 208, the remote device 108 transmits an audio indication of the determined offset to the client device 208. In some embodiments, various offsets may each have a corresponding distinct audio tone of a particular frequency, such that the transmitted audio indication is the distinct audio tone corresponding to the determined offset. For example, an audio tone of 700 hertz may indicate a half frame offset, while an audio tone of 900 hertz may indicate of a three-quarter frame offset, etc. In other embodiments, the audio indication may be an audio signal other than a distinct audio tone.

At 210, after the client device 102 receives the audio indication, the client device determines the offset corresponding to the received indication. For example, the client device 210 may look up an offset corresponding to a frequency of an audio tone transmitted from the remote device 108. After the offset is determined, the client device 102 may determine an appropriate transmission time at which to send data audio frames to the remote device 108 over the established phone connection, such that the data audio frames will be aligned with the voice frames when transmitted. In some embodiments, the client device will determine, adjust, reset, and/or delay a time at which data audio frames are to be transmitted, such as to compensate for the offset. For example, if the offset indicates a misalignment of half a frame-length, then the client device will determine a transmission time that compensates for the half frame length, such as by delaying a transmission by the offset (e.g., 10 ms when using 20 ms frames); if the offset indicates a misalignment of three-quarters of a frame-length, then the transmission time will be delayed by a three-quarters of a frame length (e.g., 15 ms when using 20 ms frames), etc. In some embodiments, as part of determining a transmission time, the client device 102 may set (or reset) a time, a timer, an alarm, a trigger, an event clock, and/or other indicator of when to transmit data audio frames.

At 212a-212n, the client device 102 transmits one or more data audio frames to the remote device 108 based on the determined transmission time.

It will be appreciated that in other embodiments, the roles of the client device 102 and the remote device 108 may be reversed, such that the remote device 108 performs the actions described with respect to the client device 102, and vice versa.

FIG. 2B depicts an embodiment in which the client device 102 and the remote device 108 are interacting to perform two-way synchronization, so as to synchronize data audio frames transmitted from the client device 102 to the remote device 108 with voice frames utilized by the wireless telephone communication system, and to synchronize data audio frames transmitted from the remote device 108 to the client device 102 with voice frames.

In particular, the client device 102 establishes a phone connection, at 222, and transmits synchronization audio frames, at 224. At 226, The remote device 108 analyzes the received audio to determine an offset between the synchronization frames and the underlying voice frames utilized by the wireless telephone communication system to process the synchronization frames sent by the client device 102, and at 228, transmits an audio indication of the determined offset to the client device 102. The client device 102 determines a transmission time for sending data audio frames to the remote device 108 to compensate for the determined offset at 230. The interactions and processing of 222-230 are similar to those described with respect to 202-210 with respect to FIG. 2A.

In a similar manner, the remote device 108 interacts with the client device 102 to synchronize its data audio frames with the voice frames, such that the remote device 108 may communicate data to the client device 102 via the wireless telephone communication system. At 232, the remote device 108 transmits synchronization audio frames to the client device 102 via the phone connection established at 222. At 234, the client device 102 analyzes the received audio to determine an offset between the synchronization frames transmitted by the remote device 108 and the underlying voice frames utilized to process the synchronization frames. At 236, the client device 102 transmits an audio indication of the determined offset to the remote device 108. After the remote device 108 receives the indication from the client, the remote device 108 determines a transmission time for sending data audio frames to the client device 102 to compensate for the determined offset.

After the client device 102 and remote device 108 have been synchronized, they may exchange aligned/synchronized data audio frames. For example, interactions 240a-240n illustrate the client device 102 transmitting one or more data audio frames to the remote device 108 based on the transmission time determined at 230; and interactions 242a-242n illustrate the remote device 108 transmitting one or more data audio frames to the client device 102 based on the transmission time determined at 238.

It will be appreciated that the sequences described with respect to FIG. 2B are merely illustrative and may be varied in other embodiments. For example, in some embodiments, 232-236 may be performed before and/or simultaneously with 224-228. In addition, although the 240a-240n are illustrated as occurring prior to 242a-242n, it will be appreciated that the order of the transmission of data audio frames may vary, and in some cases, the client device 102 and the remote device 108 may simultaneously exchange data audio frames.

Figure 3B:
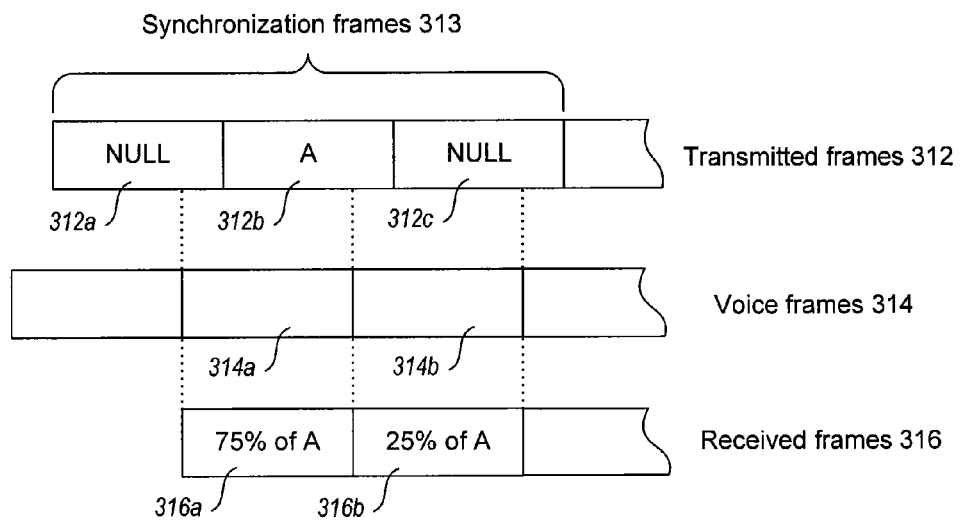
Figure 3C:
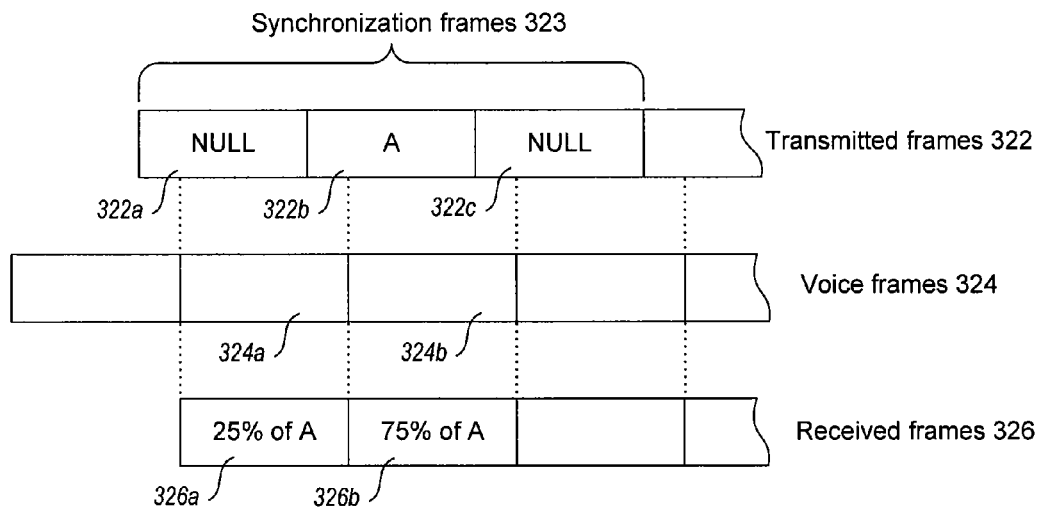
Figure 3D:
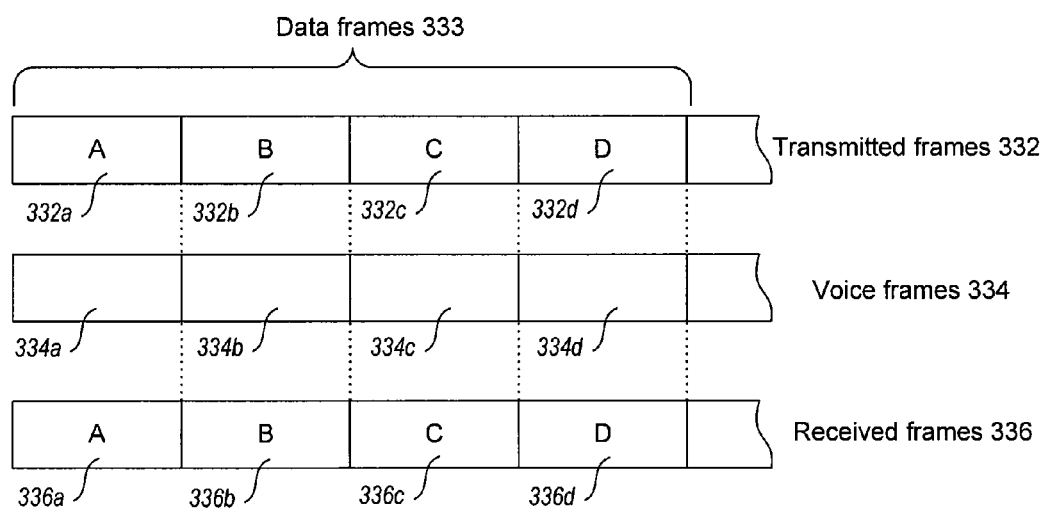

FIGS. 3A-3D illustrate example embodiments of transmitting audio frames in a voice channel data communication system. In particular, FIGS. 3A-3C illustrates synchronization frames that are transmitted from a first device to a second device via a voice channel of a wireless telephone communication system for the purposes of synchronizing data audio frames, such as synchronization frames transmitted by the client device 102 in interactions 202 (FIG. 2A) and 222 (FIG. 2B) and/or by the remote device 108 in interaction 232 (FIG. 2b). FIG. 3D illustrates data audio frames that are transmitted from a first device to a second device after synchronization occurred between the first and second devices, such as data audio signals transmitted by the client device 102 in interactions 212a-212n (FIG. 2A) and 240a-240n (FIG. 2B) and/or by the remote device 108 in interactions 242a-242n (FIG. 2B).

In FIG. 3A, the transmitted audio frames 302 are transmitted by a first device to a second device via a voice channel of a wireless telephone communication system, such as via an established phone connection between the first and second devices. The voice frames 304 correspond to voice frames utilized by the wireless telephone communication system to process audio corresponding to the transmitted audio frames 302. The received audio frames 306 correspond to the audio received at the second device via the phone connection, after the transmitted audio frames 302 have been processed by the wireless telephone communication system. In this illustration, the first and second devices use audio frame lengths that are equivalent to the frame lengths of the voice frames 304. For example, frame 302a, 304a, and 306a all have the same frame length. For the purposes of discussing FIGS. 3A-3D, the frame length is assumed to be 20 milliseconds, although other embodiments are possible.

In this illustrated embodiment, the transmitted audio frames 302 are out of synch with the voice frames 304 by approximately half a frame-length (e.g., a 10 ms offset). Thus, when the wireless telephone communication system processes audio corresponding to the transmitted frames 302, each of the voice frames combines portions of audio from neighboring frames. For example, voice frame 304a includes audio corresponding to the last half of frame 302a and the first half of 302b; voice frame 304b includes audio corresponding to the last half of frame 302b and the first half of 302c; and voice frame 304c includes audio corresponding to the last half of frame 302c and the first half of 302d. As a result, each of the received audio frames 306 contains audio corresponding to combined portions of the originally transmitted frames 302, such as processed by the voice frames 304. Thus, frame 306a corresponds to audio processed in voice frame 304a; frame 306b corresponds to voice frame 304b; and so on.

The transmitted audio frames 302 include synchronization frames 303 (e.g., frames 302a, 302b, and 302c), that are sent by the first device to the second device for the purposes of synchronizing with the voice frames 304. The synchronization frames 303 include a NULL audio frame 302a, a non-NULL audio frame 302b, and a NULL audio frame 302c. The audio signal "A" in frame 302b is a non-NULL audio signal. The non-NULL audio signal may be any non-zero audio signal such as, but not limited to, audio signals of the following frequencies: 600 hertz, 1000 hertz, 1500 hertz, etc. The NULL audio signals, 302a and 302b, correspond to audio silence, and in some cases may have a frequency of 0 hertz.

The offset between the synchronization frames 303 and the voice frames 304 is determined by analyzing the received audio frames 306 corresponding to the transmitted synchronization frames 303. The amount of offset corresponds to the amount of energy (or approximate amount of energy) present in the first two frames of the received audio (e.g., frames 306a and 306b) with respect to each other. In particular, in this embodiment, the offset may be determined as a function of the proportional amount of energy present in the first frame, such that if the first frame has 10% of the energy, then the offset is 1/10 (one-tenth) a frame length (e.g., 2 ms); if the first frame has 25% of the energy, then the offset is 1/4 (one-fourth) of a frame length (e.g., 5 ms); if 50%, then 1/2 (one half) of a frame length (e.g., 10 ms); etc. The offset that is being determined in this embodiment is an offset between the first transmitted synchronization frame 302a, and the first voice frame 304a that includes audio corresponding to the non-NULL synchronization frame 302b. In the illustrated embodiment of FIG. 3A, the first frame 306a has 50% of the energy, and the second frame 306a has 50% of the energy, which corresponds to a 10 ms offset.

In some embodiments, there may be a fixed number of candidate offsets from which the offset is determined. For example, in some such embodiments, the candidate offsets may roughly correspond to a small offset (e.g., 4 ms), a medium offset (e.g., 10 ms), and large offset (e.g., 16 ms). In some such embodiments, the appropriate candidate offset may be determined based on which of the candidate offsets the proportional amount of energy in the first frame most closely approximates. For example, a proportional energy of 5% to 33% may correspond to a small offset; a proportional energy of 34 to 66% may correspond to a medium offset; and a proportional energy of greater than 67% to 95% may correspond to a large offset.

FIG. 3B is similar to FIG. 3A, but in this illustrated example, the transmitted synchronization frames 313 are offset from the voice frames 314 by 3/4 (three-fourths) of a frame length. As such, when the wireless telephone communication system processes audio corresponding to the transmitted frames 312, each of the voice frames includes portions of audio from neighboring frames. For example, voice frame 314a includes audio corresponding to the last 1/4 of frame 312a and the first 3/4 of frame 312b; voice frame 314b includes audio corresponding to the last 1/4 of frame 312b and the first 3/4 of 312c. As a result, each of the received audio frames 316 contains audio corresponding to combined portions of the originally transmitted frames. For example, frame 316a corresponds to audio processed in voice frame 314a, and frame 316b corresponds to voice frame 314b. Thus, the received frame 316a has 75% of the energy, while the second received frame 316b has 25% of the energy, which corresponds to an offset of 15 ms.

FIG. 3C is also similar to FIG. 3A, but in this illustrated example, the transmitted synchronization frames 323 are offset from the voice frames 324 by 1/4 (one-fourth) of a frame length. As such, when the wireless telephone communication system processes audio corresponding to the transmitted frames 322, each of the voice frames includes portions of audio from neighboring frames. For example, voice frame 324a includes audio corresponding to the last 3/4 of frame 322a and the first 1/4 of 322b; voice frame 324b includes audio corresponding to the last 3/4 of frame 322b and the first 1/4 of 322c. As a result, each of the received audio frames 326 contains audio corresponding to combined portions of the originally transmitted frames. For example, frame 326a corresponds to audio processed in voice frame 324a, and frame 326b corresponds to voice frame 324b. As such, the first received frame 326a has 25% of the energy, and the second received frame 326b has 75% of the energy, which corresponds to an offset of 5 ms.

In other embodiments, the offset may be determined in other ways. For example, although the illustrated examples above describe the offset as being based on a proportional amount of energy in the first received frame, it will be appreciated that in other embodiments, the determination may be based on the amount of energy in the second frame. Furthermore, in some embodiments, the NULL audio signal may be a non-zero audio signal, such as, for example, a low frequency signal. Moreover, in some embodiments, the NULL audio signal may be any audio signal sufficiently different than of the non-NULL audio signal such that an offset may be determined based on a respective amount of energy present in the received frames. Furthermore, in other embodiments, the offset may be determined based on a predefined relationship between an amount of energy present in any of one or more received audio frames corresponding to a transmitted synchronization signal.

FIG. 3D illustrates data audio frames transmitted from the first device to the second device via a voice channel of the wireless telephone network after synchronization has been performed. In particular, the transmitted audio frames 332 include the data audio frames 333. In particular, frames 332a, 332b, 332c, and 332d respectively corresponding to encoded audio A, B, C, and D. Each of the audio frames 332a-332d is aligned with a respective voice frame 334a-334d for processing by the wireless telephone communication system. As a result, the audio frames 336 received at the second device via the wireless telephone communication system each correspond to a single data audio frame that was transmitted by the first device.

Figure 4:
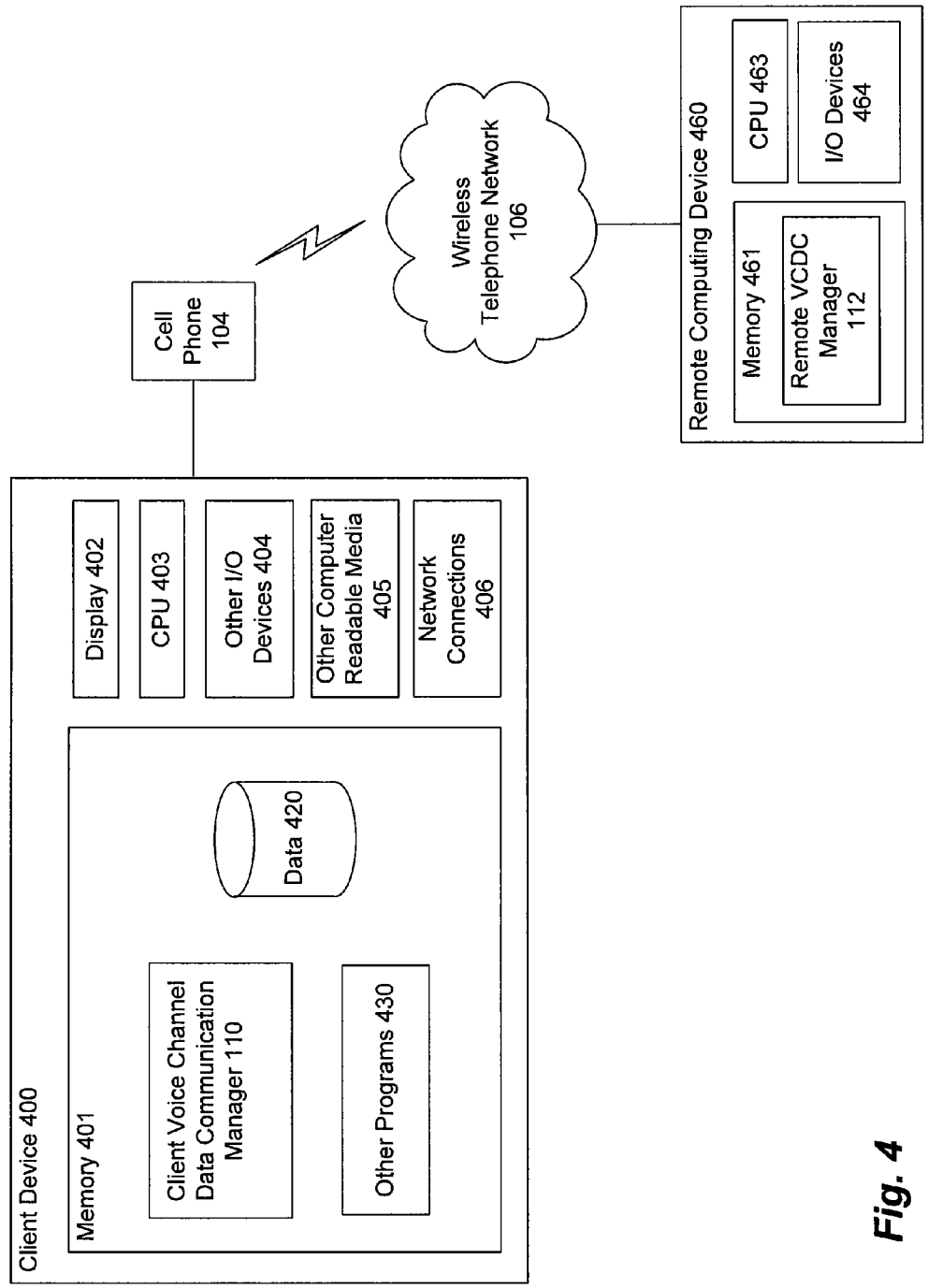
FIG. 4 is a block diagram of an example computing system suitable for facilitating data communication over a voice channel of a wireless telephone communication system.

FIG. 4 is a block diagram of an example computing system suitable for facilitating data communication over a voice channel of a wireless telephone communication system. In particular, FIG. 4 shows a client computing device 400 that may be utilized to implement an embodiment of a client voice channel data communication manager 110, and a remote computing device 460 that may be utilized to implement and embodiment of a remote voice channel data communication manager 112. In some embodiments, the client computing device 400 and/or the remote computing device 460 may comprise one or more distinct computing systems/devices and may span distributed locations. Furthermore, each block shown may represent one or more such blocks as appropriate to a specific embodiment or may be combined with other blocks. Also, the client voice channel data communication manager 110 and/or the remote voice channel data communication manager 112 may be implemented in software, hardware, firmware, or in some combination to achieve the capabilities described herein.

In the embodiment, the client computing device 400 comprises a computer memory ("memory") 401, a display 402, one or more central processing units ("CPU") 403, Input/Output devices 404 (e.g., remote control, keyboard, mouse, CRT or LCD display, and/or the like), other computer-readable media 405, and network connections 406. The client voice channel data communication manager 110 is shown residing in memory 401. In other embodiments, some portion of the contents of the client voice channel data communication manager 110 may be stored on and/or transmitted over the other computer-readable media 405. The client voice channel data communication manager 110 preferably executes on one or more CPUs 403 to perform operations related data communication via a voice channel of a wireless telephone communication system, as described herein. Other code or programs 430 and data 420, may also reside in the memory 401. Of note, one or more of the components in FIG. 4 may not be present in any specific implementation. For example, some embodiments may not include network connections 406, display 402, other computer readable media 405, etc.

The client voice channel data communication manager 110 performs various of the described functionality of the client computing device 400 related to data communication via a wireless telephone communication system, such as described with respect to FIGS. 1A-1B, 2A-2B and 3A-3D above. For example, the voice channel data communication manager 110 may perform operations such as establishing a phone connection with the remote computing device 460 via the wireless telephone network 106 by interacting with the cell phone 104, and exchanging data audio frames and/or synchronization audio frames with the remote computing device 460. Furthermore, the voice channel data communication manager 110 may perform operations such as converting data, such as data 420, into one or more encoded audio signals for transmission as one or more data audio frames; decoding received data audio frames; and/or performing operations for synchronizing data audio frames with voice frames utilized by a wireless telephone communication system (e.g., cell phone 104 and wireless telephone network 106).

In this illustrated embodiment, the remote computing device 460 comprises a memory 461, one or more CPUs 463, Input/Output devices 464 (e.g., keyboard, mouse, CRT or LCD display, and the like), and/or various other components (not shown), such as, but not limited to, computer readable media, network connections, etc. The voice channel data communication manager 112 preferably executes on one or more CPUs 463 to perform operations related to data communication via a voice channel of a wireless telephone communication system, as described herein. Furthermore, each block shown may represent one or more such blocks as appropriate to a specific embodiment or may be combined with other blocks. The remote voice channel data exchange manager 112 performs various of the functionality as described in FIGS. 1A-1B, 2A-2B and 3A-3D. In particular, the remote voice channel data exchange manager 112 may perform operations such as establishing a phone connection with the client computing device 400, transmitting/receiving audio from the wireless telephone network 106, encoding and/or decoding data audio frames, and/or performing operations to synchronize data audio frames with voice frames.

In one example embodiment, components/modules of the client voice channel data exchange manager 110 and/or the remote voice channel data exchange manager 112 are implemented using standard programming techniques. For example, the client and/or remote voice channel data exchange managers may be implemented as "native" executables running on a CPU, along with one or more static or dynamic libraries. In other embodiments, the client and/or remote voice channel data exchange managers may be implemented as instructions processed by virtual machines. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), declarative (e.g., SQL, Prolog, and the like).

The embodiments described above may also use well-known or proprietary synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques.

Furthermore, in some embodiments, some or all of the components of client voice channel data exchange manager 110 and/or the remote voice channel data exchange manager 112 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 5:
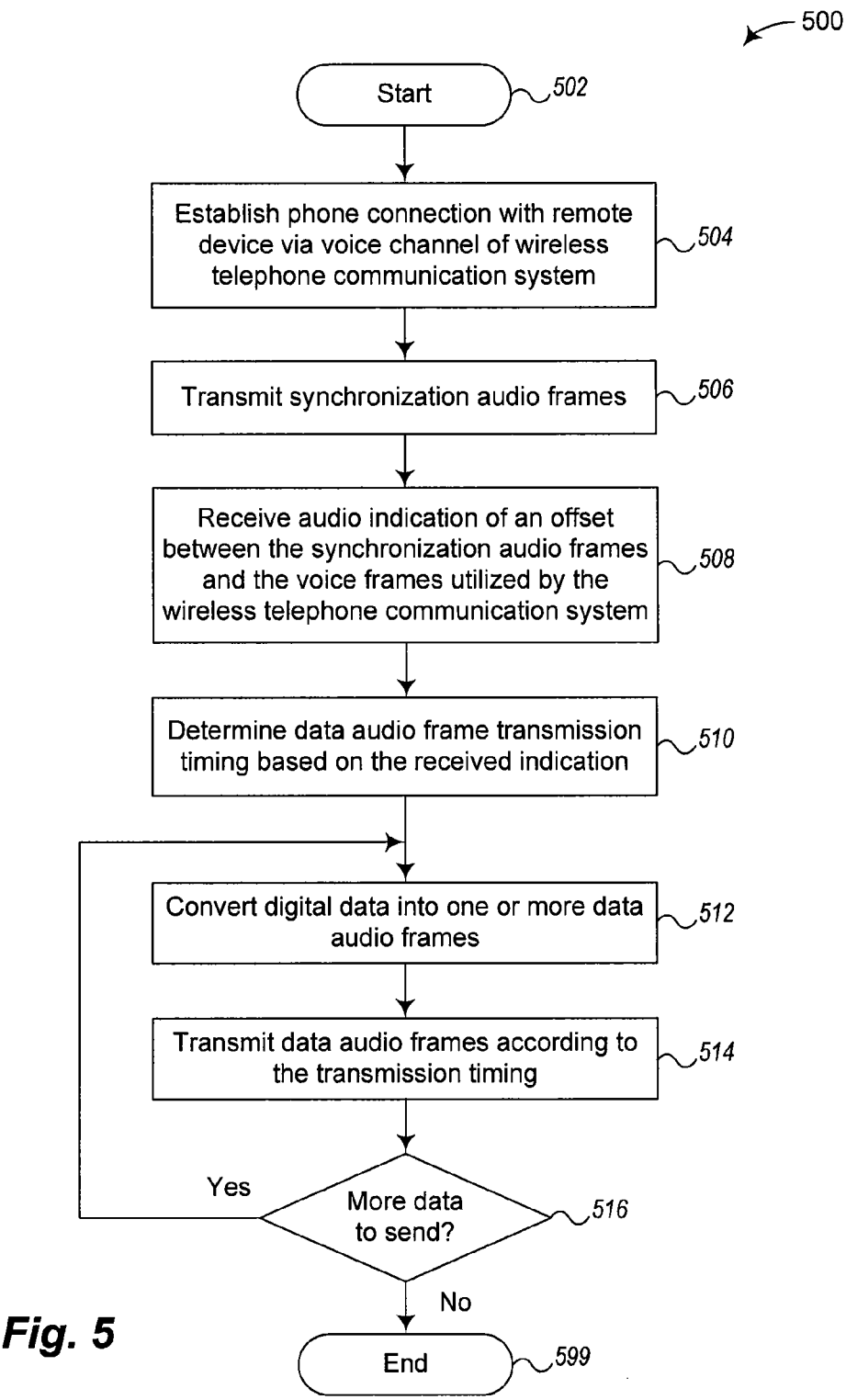
FIG. 5 is a flow diagram of an example client device routine for synchronizing data audio frames.

FIG. 5 is a flow diagram of an example client device routine for synchronizing data audio frames. In particular, FIG. 5 illustrates process 500 that may be implemented by, for example, the client voice channel data communication manager 110 executing on the client device 102, as described with respect to FIGS. 1A-1B, and/or on the client computing system 400, as described with respect to FIG. 4.

The illustrated process 500 starts at 502. At 504, the process establishes a phone connection with a remote device via voice channel of a wireless telephone communication system, such as by interacting with a wireless telephone device (e.g., a cell phone).

At 506, the process transmits synchronization audio frames to the remote device via the phone connection. For example, as described elsewhere, the transmitted synchronization frames may include a non-NULL audio frame, preceded and followed by a NULL audio frame.

At 508, the process receives via the phone connection an indication of an offset between the transmitted synchronization audio frames and the voice frames utilized by the wireless telephone communication system to transmit the synchronization frames to the remote device. In some embodiments, the indication may be an audio tone corresponding to a particular offset.

At 510, the process determines a data transmission timing based on the received indication of the offset. In particular, the process determines a transmission timing that compensates for the indicated offset, such that transmitting data audio frames to the remote device according to the timing aligns the data audio frames with voice frames utilized by the wireless telephone communication system.

At 512, the process converts digital data into one more encoded audio signals representative of the digital data, and at 514 transmits the one or more encoded audio signals as data audio frames to the remote device via the phone connection.

At 516, the process determines if there is more data to send to the remote device, and if so returns to 512. Otherwise the process continues to 599 and ends.

Some embodiments perform one or more operations/aspects in addition to the ones described with respect to process 500. For example, in one embodiment, process 500 includes operations related to receiving synchronization audio frames from a remote device, determining an offset between the received synchronization audio frames and the voice frames utilized by the wireless telephone communication system to transmit the synchronization frames, selecting and transmitting and indication of an offset to the remote device, and receiving data audio frames from the remote device, such as similar to operations described below with respect to FIGS. 6A and 6B. Furthermore, in some embodiments, if the process fails to receive an audio indication at 508 and/or is otherwise unable to determine the data audio frame transmission timing at 510, the process may return to 506 to retransmit synchronization audio frames.

Figure 6A:
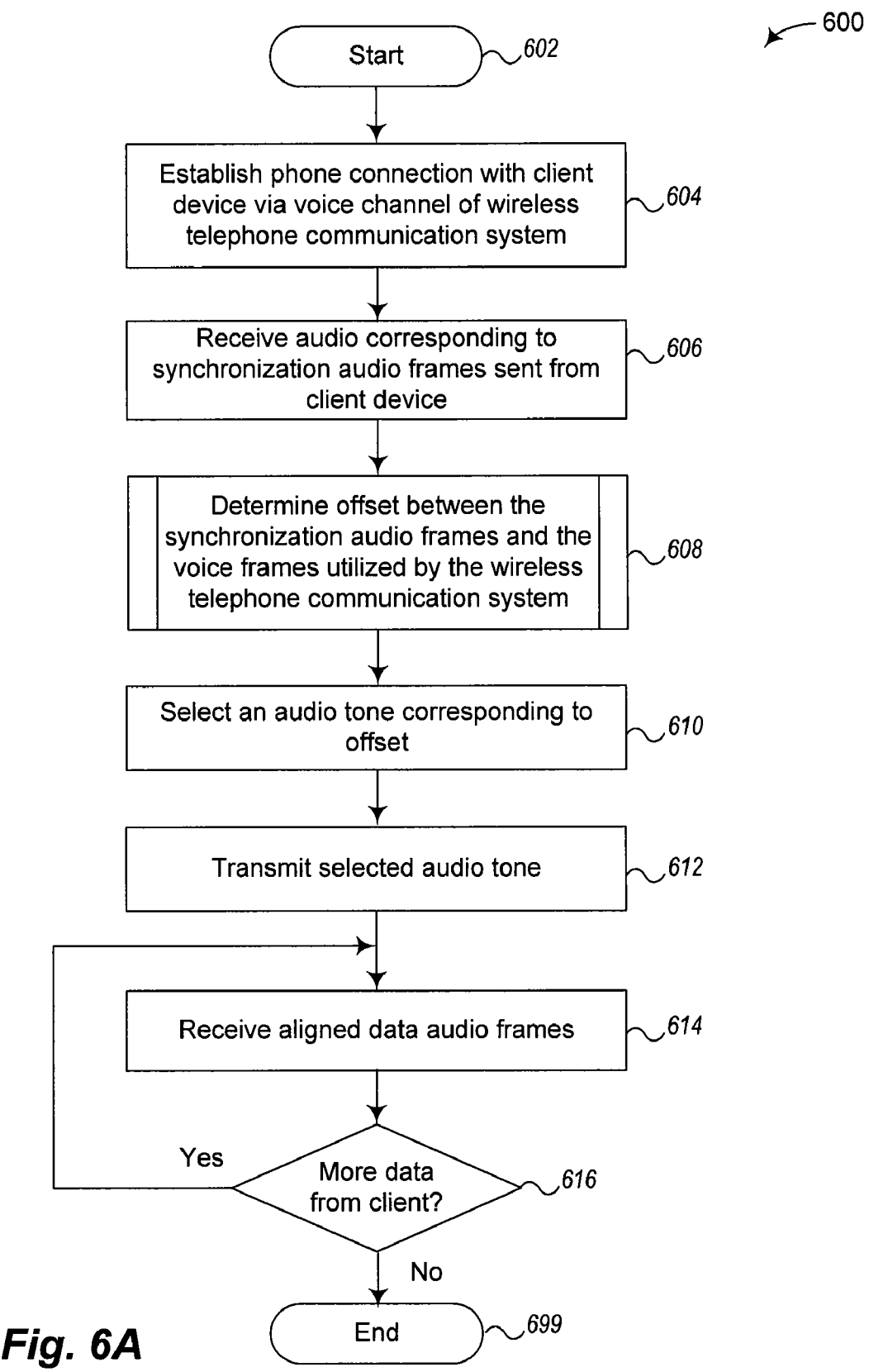
FIGS. 6A-6B illustrate a flow diagram of an example remote device routine for synchronizing data audio frames.
Figure 6B:
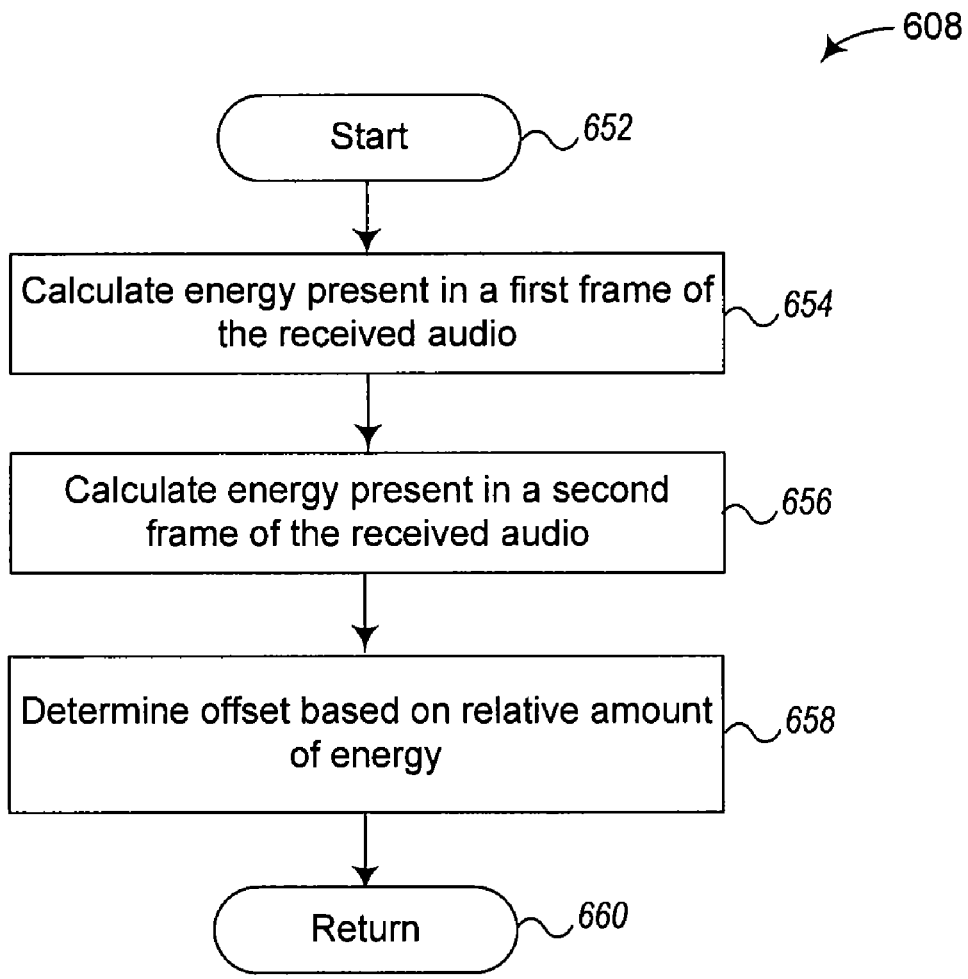

FIGS. 6A-6B illustrate a flow diagram of an example remote device routine for synchronizing data audio frames. In particular, FIG. 6 illustrates process 600 that may be implemented by, for example, the remote voice channel data communication manager 112 executing on the remote device 108, as described with respect to FIGS. 1A-1B, and/or on the client computing system 400, as described with respect to FIG. 4.

The illustrated process 600 starts at 602. At 604, the process establishes a phone connection with a client device via a voice channel of a wireless telephone communication system. For example, the process may answer a call initiated by the client device, such as initiated at 504 in FIG. 5.

At 606, the process receives audio via the phone connection corresponding to synchronization audio frames sent by the client device. For example, the process may receive the synchronization audio transmitted by the client device (e.g., at 506 of FIG. 5). As described elsewhere, the received audio may correspond to a series of audio frames transmitted by the client device including a non-NULL audio frame, preceded and followed by a NULL audio frame.

At 608, the process determines the offset between the synchronization audio frames and the voice frames utilized by the wireless telephone communication system to transmit the synchronization frames from the client device via the phone connection.

At 610, the process selects or otherwise determines an audio tone corresponding to the determined offset, and transmits the audio tone to the client device via the phone connection at 612.

At 614, the process receives data audio frames transmitted from the client device, with the data audio frames being aligned with the voice frames utilized by the wireless telephone communication system to transmit the data audio frames from the client device via the phone connection.

At 616, the process determines if there is more data audio being received from the client device, and if so returns to 614, otherwise the process continues to 699 to end.

Some embodiments perform one or more operations/aspects in addition to the ones described with respect to process 600. For example, in one embodiment, process 600 may decode the received data audio frames. Furthermore, in some embodiments, the process may transmit synchronization audio frames to the client device via the phone connection, receive and indication of an offset via the phone connection, and align a transmission of data audio frames with voice frames, such as similar to the operations described with respect to FIG. 5.

FIG. 6B illustrates an example of the subroutine 608 of FIG. 6A. In particular, the subroutine determines the offset between the synchronization audio frames and the voice frames utilized by the wireless telephone communication system to transmit the synchronization frames from the client device via the phone connection, such as based on analyzing the synchronization audio received at 606 of FIG. 6A.

The illustrated subroutine 608 starts at 652. At 654, the subroutine calculates an amount of energy present in a first frame of the received synchronization audio. For example, the subroutine may process a first 20 millisecond frame of the received synchronization audio to determine the amount of energy/amplitude present in the first 20 milliseconds of audio. At 656, the subroutine calculates an amount of energy present in a second frame of the received synchronization audio. For example, the subroutine may process a second 20 millisecond frame of the received synchronization audio subsequent to the first frame to determine the amount of energy/amplitude present in the second 20 milliseconds of audio.

At 658, the process determines the offset based on a relative amount of energy in the first and second frames of the received synchronization audio. For example, the offset may correspond to a proportional amount of energy present in the first frame of received audio with respect to the second frame of received audio, as described elsewhere.

At 660, the subroutine returns.

While various embodiments have been described hereinabove, it is to be appreciated that various changes in form and detail may be made without departing from the spirit and scope of the invention(s) presently or hereafter claimed.

What is claimed is:

1. A method for transmitting data via a voice channel of a telephone system, the method comprising:
    transmitting a first frame of audio to a remote device via the voice channel of the telephone system;
    receiving from the remote device via the telephone system an indication of an alignment offset between the first frame of audio and a first voice frame utilized by the telephone system to transmit at least a portion of the first frame of audio to the remote device;
    determining based on the indication of the alignment offset a transmission timing for transmitting a second frame of data in audio form to the remote device via the voice channel of the telephone system to cause the second frame of data in audio form to align with a second voice frame utilized by the telephone system to transmit the second frame of data in audio form; and
    transmitting the second frame of data in audio form to the remote device via the voice channel in accordance with the transmission timing.

2. The method of claim 1 further comprising modulating the second frame of data in audio form based on digital data to be transmitted to the remote device.

3. The method of claim 1 wherein the telephone system is a wireless telephone system.

4. The method of claim 1 wherein the transmission timing is an amount of time to delay the transmitting of the second frame of data in audio form.

5. The method of claim 1 wherein transmitting the first frame of audio further comprises transmitting a frame of NULL audio prior to and subsequent to transmitting the first frame of audio.

6. The method of claim 5 wherein the first frame of audio has a length corresponding to a length of the first voice frame utilized by the telephone system to transmit the at least a portion of the first frame of audio to the remote device, and the frame of NULL audio has a length corresponding to at least the length of the first voice frame.

7. The method of claim 1, wherein the indication of the alignment offset is an audio tone, the method further comprising determining the alignment offset based on the audio tone.

8. The method of claim 1, further comprising:
    receiving audio from the remote device via the voice channel, the received audio including a third frame of audio transmitted from the remote device via the voice channel;
    analyzing the received audio to determine an alignment offset between the third frame of audio transmitted from the remote device and a third voice frame utilized by the telephone system to transmit at least a portion of the third frame of audio transmitted from the remote device;
    sending an indication of the determined alignment offset to the remote device via the voice channel.

9. The method of claim 8, wherein the analyzing the received audio further includes determining an amount of energy present in a first portion of the received audio, and wherein the alignment offset between the third frame of audio transmitted from the remote device and the third voice frame utilized by the telephone system to transmit the at least a portion of the third frame of audio transmitted from the remote device is determined based at least in part on the amount of energy.

10. The method of claim 9, wherein the determining further includes:
    determining a relative amount of energy present in the first portion of the received audio with respect to a second portion of the received audio, the first and second portions having a length that corresponds to a length of the third voice frame utilized by the telephone system; and
    determining the alignment offset between the third frame of audio transmitted from the remote device and the third voice frame utilized by the telephone system to transmit the at least a portion of the third frame of audio transmitted from the remote device based on the relative amount of energy present in the first portion of the received audio.

11. A method for facilitating transmission of data via a voice channel of a telephone system, the method comprising:
    receiving first audio including a first frame of audio transmitted from a client device via the voice channel of the telephone system;
    analyzing the first audio to determine an alignment offset between the first frame of audio and a first voice frame utilized by the telephone system to transmit at least a portion of the first frame of audio from the client device;
    sending an indication of the alignment offset to the client device via the voice channel; and
    receiving second audio including a second frame of data in audio form transmitted from the client device via the voice channel of the telephone system, the second frame of data in audio form being aligned with a second voice frame utilized by the telephone system to transmit the second frame of data in audio form from the client device using the indication of the alignment offset.

12. The method of claim 11, wherein the analyzing the first audio further comprises determining an amount of energy present in at least a first portion of the first audio, and wherein the alignment offset is determined based at least in part on the determined amount of energy.

13. The method of claim 12, wherein the determining further comprises:
    determining a relative amount of energy present in the first portion of the first audio with respect to a second portion of the first audio, the first and second portions having a length that corresponds to a length of the first voice frame utilized by the telephone system; and
    determining the alignment offset based on the relative amount of energy present in the first portion.

14. The method of claim 11, wherein the indication is an audio tone, the method further comprising:
    selecting an audio tone that corresponds to the alignment offset; and
    transmitting the audio tone to the client device via the voice channel.

15. The method of claim 11, further comprising:
    analyzing the second audio to identify the second frame of data in audio form; and
    determining a digital data value corresponding to the second frame of data in audio form.

16. A device, comprising:
    one or more processors; and
    a data communication manager that is configured to, when executed by at least one of the one or more processors, facilitate transmission of data via a voice channel of a telephone system by:

receiving first audio including a first frame of audio transmitted from a client via the voice channel of the telephone system;

analyzing the first audio to determine an alignment offset between the first frame of audio and a first voice frame utilized by the telephone system to transmit at least a portion of the first frame of audio from the client; and sending an indication of the alignment offset to the client via the voice channel.

17. The device of claim 16, wherein the data communication manager is further configured to receive second audio including a second frame of data in audio form transmitted from the client via the voice channel of the telephone system, the second frame of data in audio form being aligned with a second voice frame utilized by the telephone system to transmit the second frame of data in audio form from the client using the indication of the alignment offset.

18. The device of claim 16, wherein the data communication manager is further configured to determine an amount of energy present in at least a portion of the first audio, and determine the alignment offset based at least in part on the determined amount of energy.

19. The device of 16, wherein the data communication manager is further configured to determine a relative amount of energy present in a first portion of the first audio with respect to a distinct second portion of the first audio, the first portion and the distinct second portion having a length equivalent to a length of the first voice frame utilized by the telephone system.

20. The device of claim 16, wherein the alignment offset is an amount of delay between the first frame of audio and the first voice frame.

21. The device of claim 16, wherein the data communication manager is further configured to:

transmit a second frame of audio to the client via the voice channel; and determine a transmission timing to align a transmission of a third frame of data in audio form to the client via the voice channel with a second voice frame utilized by the telephone system to transmit the third frame of data in audio form, the transmission timing based on an offset between the second frame of audio and a third voice frame utilized by the telephone system to transmit at least a portion of the second frame of audio to the client.

22. The device of claim 21 wherein the second frame of audio has a duration that that corresponds to a length of the third voice frame.

23. The device of claim 22 wherein the data communication manager is further configured to transmit a frame of NULL audio of at least the duration prior to and subsequent to transmitting the second frame of audio.

24. The device of claim 16, wherein the client is a television receiving device.

25. The device of claim 16, wherein the telephone system is a wireless telephone system including a wireless telephone.

26. The device of claim 25, wherein the client is communicatively coupled to the wireless telephone.

* * * * *